E. B. MEAD.
METHOD OF GEAR MANUFACTURE.
APPLICATION FILED SEPT. 25, 1915.

1,233,681.

Patented July 17, 1917.
3 SHEETS—SHEET 1.

INVENTOR
Ezra B. Mead.
BY
Morsell, Keeney & French,
ATTORNEYS

E. B. MEAD.
METHOD OF GEAR MANUFACTURE.
APPLICATION FILED SEPT. 25, 1915.
1,233,681.
Patented July 17, 1917.
3 SHEETS—SHEET 2.
Fig. 4.
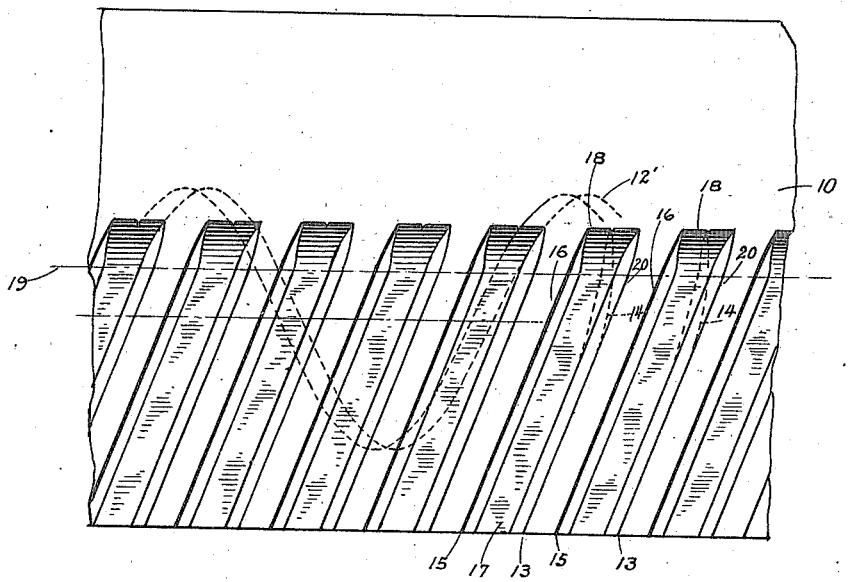
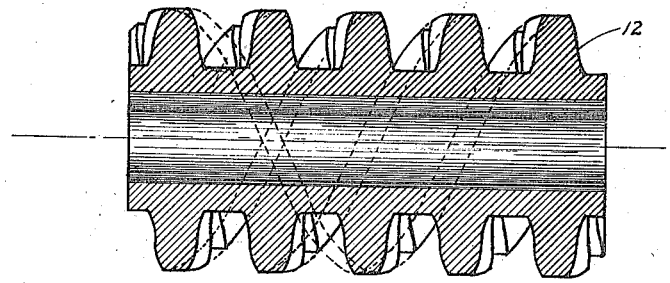
Fig. 5.
INVENTOR
Ezra B. Mead,
BY
Morsell, Keeney & French,
ATTORNEYS.

E. B. MEAD.
METHOD OF GEAR MANUFACTURE.
APPLICATION FILED SEPT. 25, 1915.

1,233,681.

Patented July 17, 1917.
3 SHEETS—SHEET 3.

INVENTOR
Ezra B. Mead.
BY
Morsell, Keeney & French.
ATTORNEYS.

UNITED STATES PATENT OFFICE.

EZRA B. MEAD, OF OTTUMWA, IOWA.

METHOD OF GEAR MANUFACTURE.

1,233,681.      Specification of Letters Patent.      Patented July 17, 1917.

Application filed September 25, 1915. Serial No. 52,603.

*To all whom it may concern:*

Be it known that I, EZRA B. MEAD, a citizen of the United States, and resident of Ottumwa, in the county of Wapello and State of Iowa, have invented new and useful Improvements in Methods of Gear Manufacture, of which the following is a description, reference being had to the accompanying drawings, which are a part of this specification.

This invention relates to improvements in method of gear manufacture by the hobbing process and more particularly to the manufacture of herringbone gears.

It is the present practice in the manufacture of gears using the hobbing process of cutting the teeth, to use a hob cutter so positioned that the tangent to the helix of the hob at the pitch line is parallel with the teeth being cut. Both the gear blank and the hob are revolved and the hob is fed slowly across the gear blank to form continuous cuts. In cutting spur gears either the hob arbor or the gear blank table or arbor are mounted on a swivel joint to attain the desired relative position. In cutting herringbone gears very careful adjustment of the hob is necessary in forming the teeth and a right and a left handed hob are used for cutting the teeth on opposite sides of the blank.

In cutting herringbone teeth the hobs necessarily have to cut beyond the center line dividing the two sets of teeth and cut into the opposite teeth to a considerable extent and these cut into portions are sometimes removed by cutting a circumferential groove through said cut portions and in any case leave a portion at the center of the gear inactive. Under the present practice this inactive part is of considerable width and to get the necessary area of tooth contact the gear is increased in width to the desired extent. Furthermore in cutting the blanks with the ordinary hobs one side of the tooth of the blank is finished in advance of the center of the hob on the outside of the pitch line and to the rear of the center of the hob on the inside of the pitch line of the tooth of the blank and just the reverse on the opposite side of the tooth. The tooth thus formed is perfect only in that portion over which the hob has completely passed and to avoid too great an inactive portion at the center it is the usual custom to mesh two companion gears together and run them with a grinding compound to grind off imperfect parts.

It is one of the objects of the present invention to overcome the before mentioned objectionable features and provide a method of spur gear manufacture in which the hob cutters are axially mounted in a line at right angles to the axis of the gear blank.

A further object of the invention is to provide a method of gear manufacture in which the direction of the finished tooth of the blank does not coincide with the direction of the tangent of the pitch line of the hob's helix, thereby removing more metal with one side of the hob than the other, obviating some of the difficulties of backlash in the table drive.

A further object of the invention is to provide a method of herringbone gear manufacture whereby the inactive portion between the two sets of teeth of a herringbone gear may be formed of the minimum width thus lessening the width of the gear but retaining the same area of tooth contact.

A further object of the invention is to provide a method of herringbone gear manufacture in which the teeth are cut by means of two hobs of different helical angles for each set of right and left handed teeth, whereby both sides of the teeth are cut in advance of the center of the hobs.

A further object of the invention is to provide a method of gear manufacture in which the teeth of herringbone gears are cut so perfectly as to eliminate the excessive grinding.

A further object of the invention is to provide a method of gear manufacture which is of very simple construction and is well adapted for the purpose described.

With the above and other objects in view the invention consists of the improved method of gear manufacture and its parts and combinations as set forth in the claims, and all equivalents thereof.

In the accompanying drawing in which the same reference characters indicate the same parts in all of the views:

Fig. 4 is a top view of the blank shown in Fig. 2 after the teeth have been cut with a four thread hob;

Fig. 5 is a longitudinal sectional view of the four thread hob used in completing the teeth;

Figure 1:
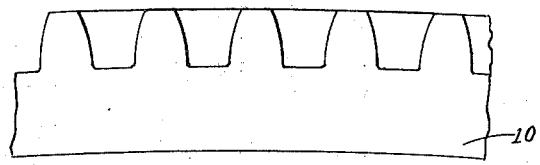
Figure 1 is an edge view of a portion of a herringbone gear blank cut in accordance with the improved method.

Referring to the drawings the numeral 10 indicates a herringbone gear blank of ordinary form and 11 a two thread hob cutter and 12 a four thread hob cutter.

Figure 2:
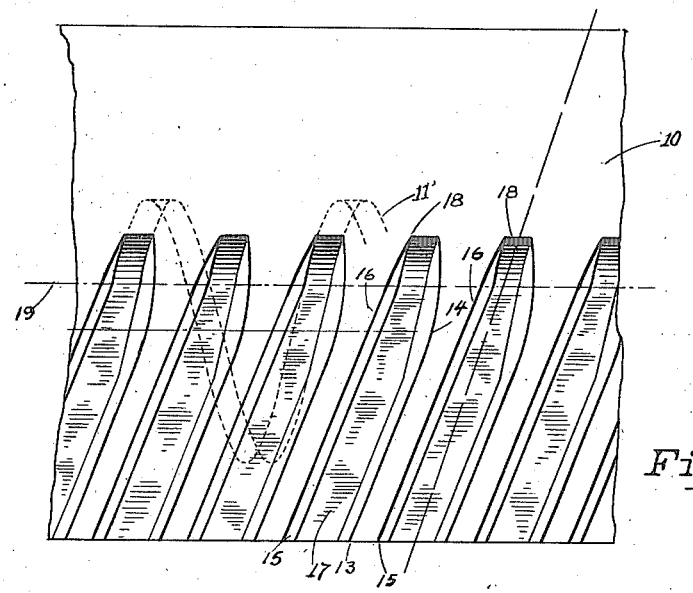
Fig. 2 is a top view thereof showing teeth cut on one side portion of the blank as cut by the two thread hob.
Figure 3:
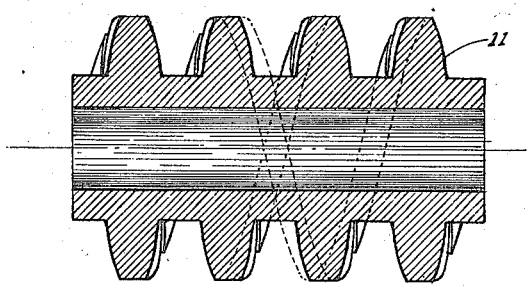
Fig. 3 is a longitudinal sectional view of the two thread hob used in making the first cut on one side of the blank.
Figure 6:
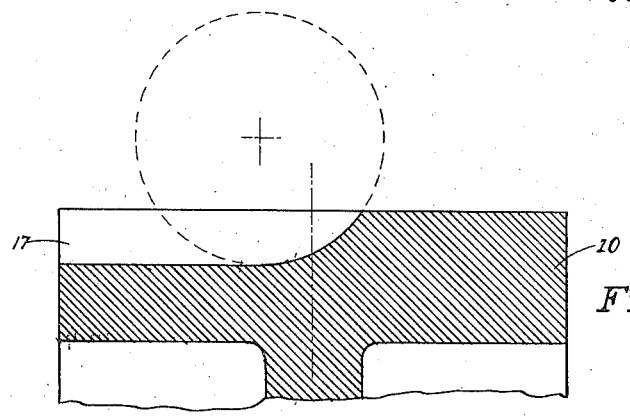
Fig. 6 is a detail sectional view of a herringbone gear blank showing the teeth cut on one side of the blank, the hob being indicated in dotted lines.
Figure 7:
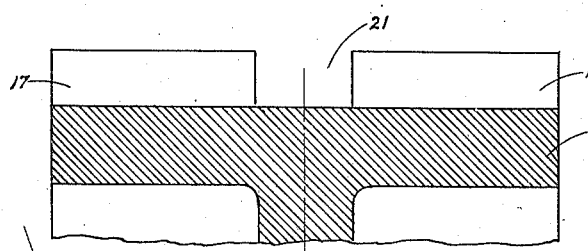
Fig. 7 is a similar view showing teeth cut on both sides of the blank and with the circumferential groove formed which divides the two sets of teeth.
Figure 8:
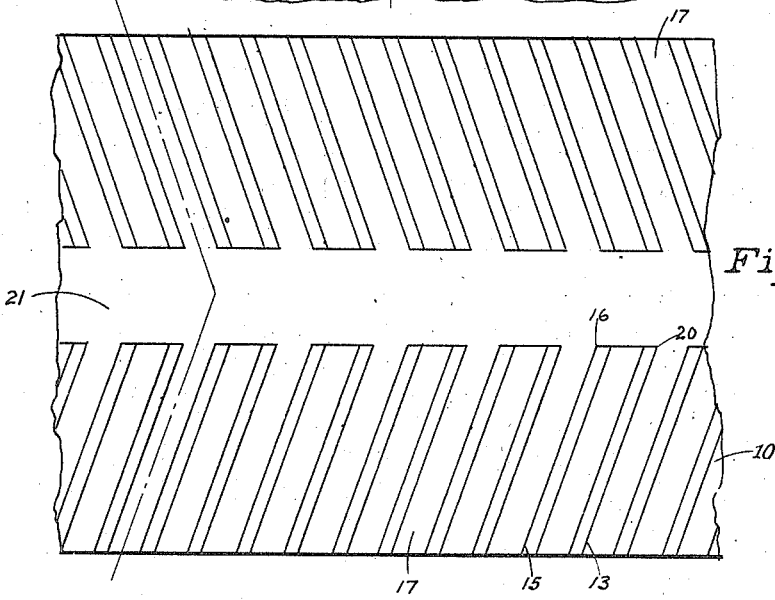
Fig. 8 is a top view of a portion of a completed herringbone gear.

In cutting the teeth the hobs are mounted on a cutting machine (not shown) of ordinary construction and positioned to extend at right angles to the axis of the herringbone gear blank as indicated by the dotted spiral lines 11' and 12' shown in Figs. 2 and 4. The two thread hob 11 is first used to cut the teeth and in cutting the teeth it will be noted that this hob will finish the teeth from a point 13 to 14 on one side of each tooth and from a point 15 to 16 on the other side of said teeth as shown in Fig. 2. It will also be noted that on one side of the intertooth space 17 the line of cut 15 to 16 is of greater length than the line of cut between 13 and 14. This unequal cutting is caused by the angle of the teeth of the herringbone gear with relation to the angle of the hob which causes the hob to cut on one side in advance of its center line and on the other side to the rear of its center line. The teeth are cut beyond the center line of the gear a distance equal to half the distance between the end of the straight line cut 15, 16 and the extreme end 18 of the cut as indicated by the dotted center line 19. This operation leaves a portion on one side of each tooth between the points 14 and 18 which is unfinished.

The four thread hob is now substituted for the two thread hob and the cutting operation is repeated. As the spirally trending cutting teeth of the four thread hob extend at a greater angle than the cutting teeth of the two thread hob, the teeth of the herringbone gear blank will be cut to a point in advance of the center line of hob on the opposite side of the hob to that cut with the two thread hob and likewise the side of the four thread hob cutting to the rear of its center line will be opposite to the similar cut of the other hob. The line of cut of the four thread hob extends from the point 14 to the point 18 at the end of the cut and thus forms perfect teeth between the point 14 and the point 20.

The V-shaped portions at the upper ends of the spaces 17 in Fig. 4 are projections or uncut material left by the passage of the two hobs at the points of crossing of the lines of cut of each hob and in passing out of the material. This portion is afterward removed in cutting the circumferential groove 21.

After the teeth on one side of the blank have been cut the same operations are used for cutting the teeth on the other side with the exception that hobs of the opposite angle or hand are used.

When the teeth on both sides of the gear are completed the mutilated portions of the teeth between the opposite sides are removed by cutting a circumferential groove 21 around the gear.

While the method describes the two thread hob as being initially used to cut the teeth the order of use may be reversed by first cutting with the four thread hob and then with the two thread hob as the same results will be obtained, or the two operations may take place together by placing the hobs at different points on the periphery of the blank and properly timing each hob with the revolutions of the blank.

In using the hob with two threads two teeth of the gear must pass the hob at every revolution of the hob, and with the four thread hob four teeth of the gear must pass the hob at every revolution of the hob. This relative difference in movement when cutting with the different hobs is accomplished by increasing the rotation of the gear blank to twice the rate of speed when using the four thread hob or by reducing the speed of the four thread hob.

While the method described varies the direction of the hob teeth by increasing the number of threads in the hob this is to be regarded only as the preferred method. This change of direction may be accomplished by varying the diameter of hob or the direction of its axis.

Each hob cutter is shaped to form a perfect tooth when passed entirely across the blank being cut.

From the foregoing description it will be seen that the method of gear manufacture is very simple and that the finished tooth of the gear does not coincide with the direction of the tangent of the pitch line of the hob's spiral, and furthermore that the teeth of the herringbone gear are cut in a manner to reduce the inactive space between the two sets of teeth to the minimum.

What I claim as my invention is:

1. The method of gear manufacture, consisting of initially cutting the teeth on a gear blank with a hob cutter having a certain helical angle and then further cutting the same teeth with another hob cutter having a different helical angle.

2. The method of gear manufacture, consisting of cutting each set of teeth on a gear blank with two hobs having different helical angles, the different helical angle of the one hob causing it to remove material between the teeth uncut by the other hob.

3. The method of gear manufacture, consisting of initially cutting the teeth on a gear blank with a hob cutter having a certain number of threads and then further cutting the material between the teeth with another hob cutter having a different number of threads.

4. The method of gear manufacture, consisting of initially cutting the teeth on a gear blank with a hob cutter having a certain number of threads and then further cutting the material between the teeth with another hob cutter which has twice as many threads as the first mentioned hob.

In testimony whereof, I affix my signature.

EZRA B. MEAD.